(12) United States Patent
Yoon

(10) Patent No.: US 7,995,906 B2
(45) Date of Patent: Aug. 9, 2011

(54) ILLUMINATION DEVICE FOR VIDEO PRESENTER AND VIDEO PRESENTER HAVING ILLUMINATION DEVICE

(75) Inventor: Jeong-han Yoon, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 281 days.

(21) Appl. No.: 12/474,409

(22) Filed: May 29, 2009

(65) Prior Publication Data

US 2009/0323303 A1    Dec. 31, 2009

(30) Foreign Application Priority Data

Jun. 30, 2008 (KR) ........................ 10-2008-0062867

(51) Int. Cl.
*G03B 15/02* (2006.01)
(52) U.S. Cl. ............................................................ 396/4
(58) Field of Classification Search .................. 396/4, 5, 396/175, 419, 428; 362/16, 18
See application file for complete search history.

(56) References Cited

U.S. PATENT DOCUMENTS

| | | | | |
|---|---|---|---|---|
| 2,281,378 A * | 4/1942 | Ohm | ............................... | 362/335 |
| 2,494,495 A * | 1/1950 | Tait et al. | .......................... | 355/21 |
| 3,267,799 A * | 8/1966 | Harrison, III | ...................... | 396/5 |
| 3,488,486 A * | 1/1970 | Bretthauer | ..................... | 396/175 |
| 5,757,519 A * | 5/1998 | Yoo | ................................. | 358/475 |
| 6,008,846 A * | 12/1999 | Uehara et al. | .................. | 348/373 |
| 6,286,969 B1 * | 9/2001 | Kurokawa et al. | .............. | 362/11 |
| 6,969,033 B2 * | 11/2005 | van der Linden | .......... | 248/177.1 |
| 7,719,948 B2 * | 5/2010 | Kimura et al. | ........... | 369/112.05 |
| 7,787,159 B2 * | 8/2010 | Baldwin | ........................ | 358/482 |

* cited by examiner

*Primary Examiner* — W. B. Perkey
(74) *Attorney, Agent, or Firm* — Drinker Biddle & Reath LLP

(57) ABSTRACT

An illumination device for a video presenter includes a light source and an optical lens. The light source radiates light beams incident on a stage where an object to be photographed is placed and arranged inclined at an acute angle with respect to a surface of the stage. The optical lens is arranged between the light source and the stage and inclined to be more parallel to the stage than the light source.

16 Claims, 8 Drawing Sheets

ILLUMINATION DEVICE FOR VIDEO PRESENTER AND VIDEO PRESENTER HAVING ILLUMINATION DEVICE

CROSS-REFERENCE TO RELATED PATENT APPLICATION

This application claims the benefit of Korean Patent Application No. 10-2008-0062867, filed on Jun. 30, 2008 in the Korean Intellectual Property Office, the entire contents of which is incorporated herein by reference.

BACKGROUND OF THE INVENTION

1. Field of the Invention

The present invention relates to an illumination device and a video presenter, and more particularly, to an illumination device which provides illumination of an object or script placed on a stage, and a video presenter having the illumination device.

2. Description of the Related Art

In general, video presenters are used to present an image on a display device by photographing a 3D actual object or a 2D script placed on a stage using a camera. Unlike a general overhead projector (OHP), the video presenter displays an image of an opaque script or an actual object, or magnifies a 3D actual object or a 2D script and outputs the magnified image to a separate display device. Since a material can be shared with other persons, the video presenter is widely used for presentation.

FIG. 1 is a perspective view of a conventional video presenter. Referring to FIG. 1, the conventional video presenter includes two illumination devices 1, a photographing device 2, and a stage 3. The illumination devices 1 illuminates an actual object or a script placed on the stage 3. The photographing device 2 photographs an image of the actual object or script illuminated by the illumination devices 1. The illumination devices 1 use a fluorescent lamp, a halogen lamp, or a plurality of white high brightness LEDs as a light source. When the illumination devices 1 having the light source are in use, as shown in FIG. 2, light beams are relatively strongly radiated to the left and right sides of the stage 3 while the center portion of the stage 3 receives a relatively weaker light beam. This is because the left and right sides of the stage 3 are close to the illumination devices 1 while the center portion of the stage 3 is far from the illumination devices 1. Thus, the left and right portions of the stage 3 that are close to the illumination devices 1 have a relatively higher luminance while the center portion of the stage 3 that is positioned relatively far from the illumination devices 1 has a relatively lower luminance so that an luminance inconsistent phenomenon occurs.

To reduce the luminance inconsistent phenomenon, as shown in FIG. 3, a difference in the distance between each of the illumination devices 1 and the stage 3 throughout the overall surface of the stage 3 decreases and the distance between each of the illumination devices 1 and the photographing device 2 decreases. However, since light reflected from the surface of a glossy script, for example, vinyl coated paper, glossy paper, or film, placed on the stage 3 is photographed, a glitter phenomenon is generated in a photographed image.

Also, since the light from the illumination devices 1 travels in a space other than the stage 3, the eyes of persons standing around the video presenter may be dazzled.

SUMMARY OF THE INVENTION

The present invention provides an illumination device which emits light and makes the light illuminate the overall surface of the stage and prevents a glitter phenomenon generated as a light beam reflected by a script is directly photographed by a camera, and lessens dazzling to the eyes of a video presenter and persons standing around the video presenter.

According to an aspect of the present invention, an illumination device for a video presenter comprises a light source radiating light beams incident on a stage where an object to be photographed is placed and arranged inclined at an acute angle with respect to a surface of the stage, and an optical lens arranged between the light source and the stage and inclined, to be more parallel to the surface of the stage than the light source.

According to the above structure, the light radiated by the illumination device may be radiated to an overall surface of the stage at a uniform luminance, a bright and clear image of the object can be obtained.

An illumination device for a video presenter, the illumination device comprises a light source radiating light beams incident on a stage where an object to be photographed is placed and arranged inclined at an acute angle with respect to a surface of the stage, and an optical lens arranged between the light source and the stage and forming a path of the light beam such that an illumination area formed by the light beam output from the light source is not substantially deviated from a surface of the stage and radiated at a substantially uniform density on the surface of the stage. Thus, a glitter phenomenon that the eyes of a person around the video presenter is dazzled is lessened.

The light source includes a light emitting diode (LED) and the optical lens is a convex lens. According to the structure, as the light radiated by the illumination device is radiated to an overall surface of the stage at a uniform luminance, a bright and clear image of the object can be obtained.

The light source and the optical lens are arranged outside a space defined by an edge of the stage. Thus, a glitter phenomenon that the light beam reflected by an actual object or a script having a high reflectance is directly photographed by a camera can be lessened.

The position of the optical lens is determined in a manner that the light beams passing through the optical lens are radiated throughout substantially the overall surface of the stage at a substantially uniform density.

The illumination device for a video presenter may further comprises a distance adjustment unit adjusting a separation distance between the light source and the optical lens in the direction that the light source directs. Thus, efficiency can be improved by magnifying or reducing the area of the illumination area.

According to another aspect of the present invention, a video presenter comprises a stage where an object to be photographed is placed, a light source radiating light beams incident on the stage and arranged inclined at an acute angle with respect to a surface of the stage, an optical lens arranged between the light source and the stage and inclined to be more parallel to the stage than the light source, and a photographing unit for photographing the object.

The light source and the optical lens may be arranged outside a space defined by an edge of the stage, and the photographing unit may be arranged inside a space defined by the edge of the stage.

The acute angle may be determined in a manner that a light beam reflected from an object that is substantially planar with a high reflectance and placed on the stage of the light beams of the light source is not directly incident on the photographing unit.

The optical lens may be arranged so that the light beams passing through the optical lens are radiated throughout an overall surface of the stage at a substantially uniform density.

The video presenter may further comprise a distance adjustment unit adjusting a separation distance between the light source and the optical lens in the direction that the light source directs.

The light source and the optical lens may be symmetrically arranged with respect to the photographing unit. A surface of the stage may be rectangular or circular. The video presenter may further comprises a mask arranged between the optical lens and the stage.

BRIEF DESCRIPTION OF THE DRAWINGS

The above and other features and advantages of the present invention will become more apparent by describing in detail embodiments with reference to the attached drawings in which.

DETAILED DESCRIPTION OF THE INVENTION

Figure 1:
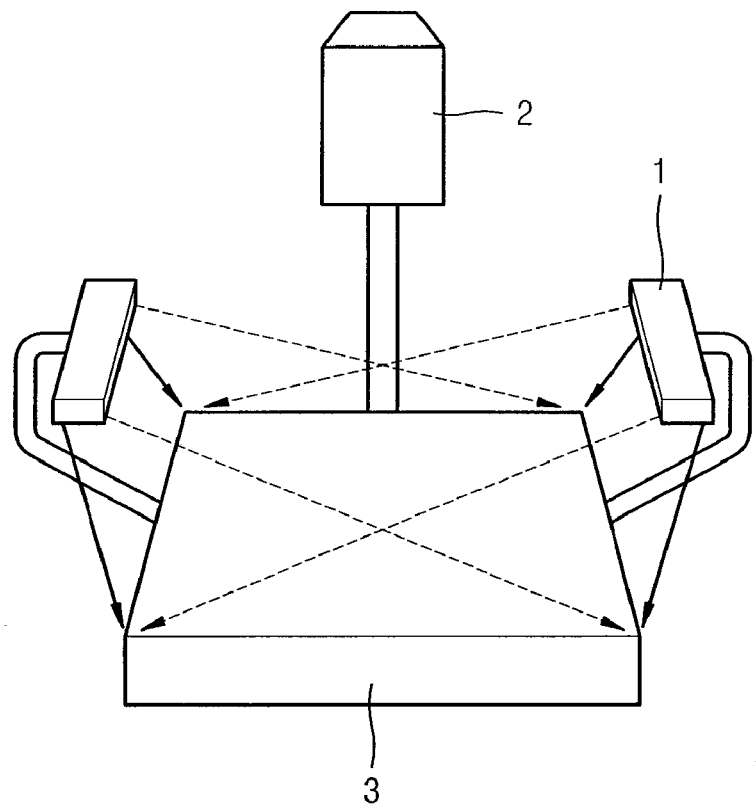
FIG. 1 is a perspective view of an example of a conventional video presenter.
Figure 2:
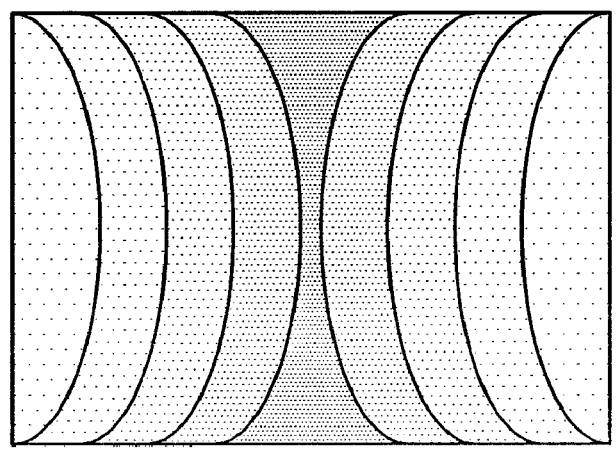
FIG. 2 illustrates that the light emitted from the illumination devices of the video presenter of FIG. 1 is radiated onto the stage.
Figure 3:
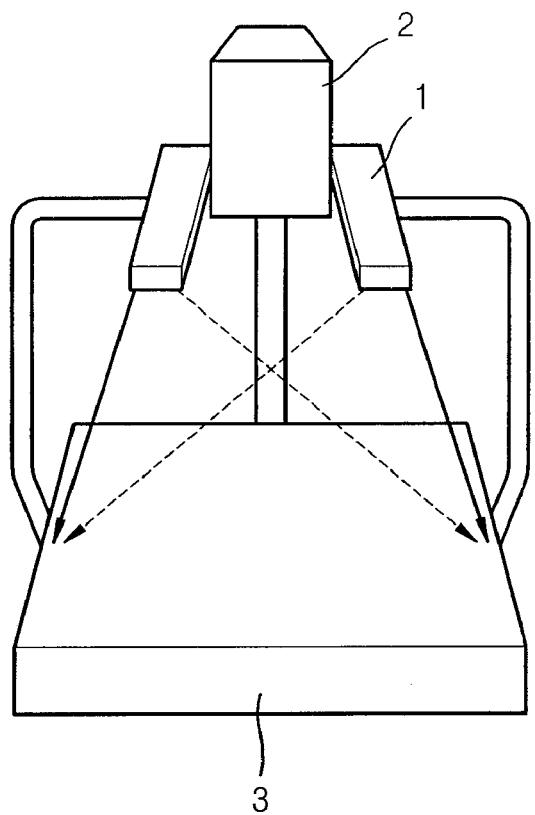
FIG. 3 is a perspective view of another example of a conventional video presenter.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 4:
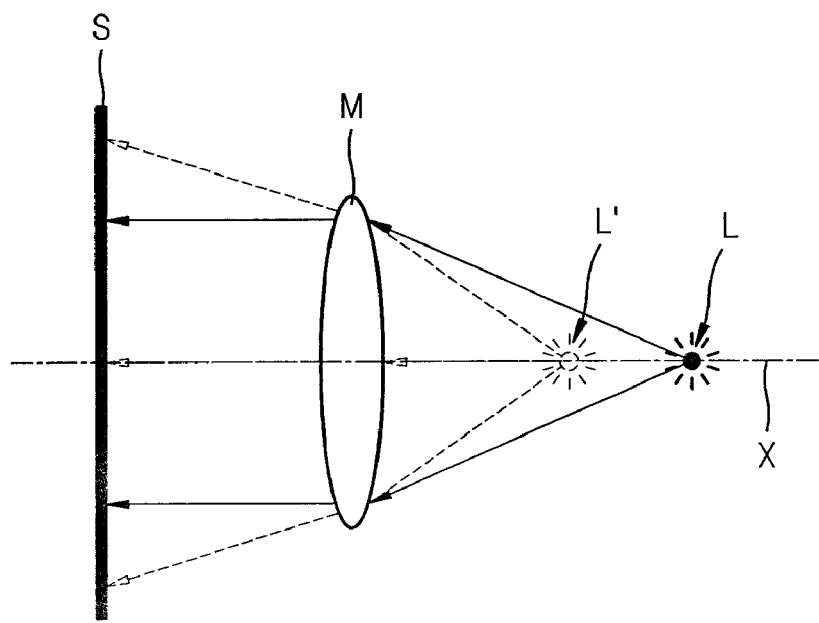
FIG. 4 illustrates an example of an optical path when the light emitted from a light source passes through a convex lens according to the position of the light source on the optical axis.

FIG. 4 illustrates an example of an optical path X when light emitted from a light source L passes through a convex lens M according to the position of the light source L on the optical axis X. Referring to FIG. 4, assuming that the light source L is close to a point light source, when the light source L is located at a focal point of the convex lens M, a light beam output from the light source L proceeds parallelly along a path indicated by a solid line. In this case, since a projection surface S corresponding to a stage surface, onto which the light beam is projected, is perpendicular to the optical axis X, the density in the radiation of the light beam is uniform throughout the projection surface S. When a light source L' is located closer than the focal point of the convex lens M, a light beam output from the light source L' proceeds by being dispersed along a path indicated by a dotted line. In this case, the light beam dispersed by the convex lens M illuminates the projection surface S more widely, but at almost uniform luminance, as in the previous case.

Figure 5:
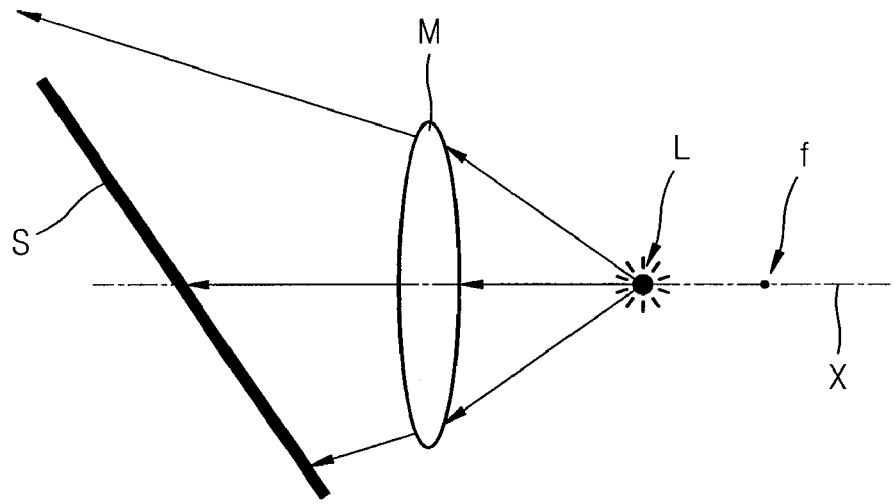
FIG. 5 illustrates an example of an optical path of light passing through the convex lens when the position of the light source is located closer than a focal point in a state in which the projection surface is inclined with respect to the optical axis.

FIG. 5 illustrates an example of an optical path of light passing through the convex lens M when the position of the light source L is located closer than a focal point f in a state in which a projection surface is inclined with respect to the optical axis X. Referring to FIG. 5, when the projection surface S is inclined with respect to the optical axis X, the upper portion of the projection surface S is separated farther from the light source L than the lower portion of the projection surface S. Also, part of the light beam output from the light source L and passing through the upper portion of the convex lens M is not incident on the projection surface S. Accordingly, the upper portion of the projection surface S has a relatively low luminance and appears darker. In contrast, the lower portion of the projection surface S is relatively closer to the light source L than the upper portion of the projection surface S. Also, almost all light beams output from the light source L and passing through the upper portion of the convex lens M are incident on the projection surface S. Accordingly, the lower portion of the projection surface S has a relatively high luminance and appears brighter. This is because the luminance is a total luminous flux over a unit area. As a surface receiving light is separated farther from a light source and the surface is more inclined with respect to a direction of light, the intensity of light decreases so that luminance is decreased. Thus, a luminance irregularity phenomenon that luminance varies according to the area of the surface of a stage is generated.

Figure 6:
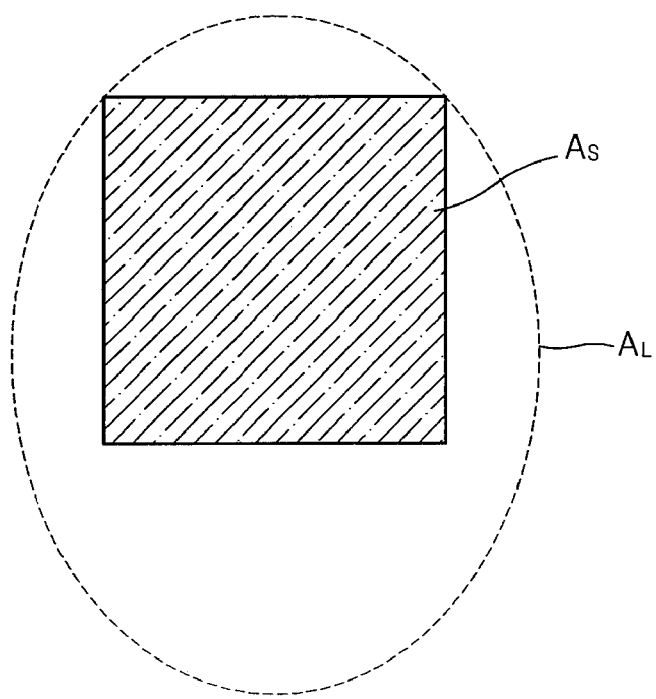
FIG. 6 illustrates an example of the stage area and the illumination area that is illuminated by the light beam radiated by the illumination device in a geometric state shown in FIG. 5.

When the luminance is not uniform, as shown in FIG. 6, an area $A_L$ illuminated by the light beam does not correspond to a projection surface (stage) area $A_S$. That is, part of the light beam output from the light source L is not radiated onto the projection surface S (stage). Also, a difference in the distance between the light source L and the projection surface S is generated according to the projection surface area $A_S$. Thus, the luminance irregularity phenomenon that the luminance at the projection surface S is not uniform is generated.

Figure 7:
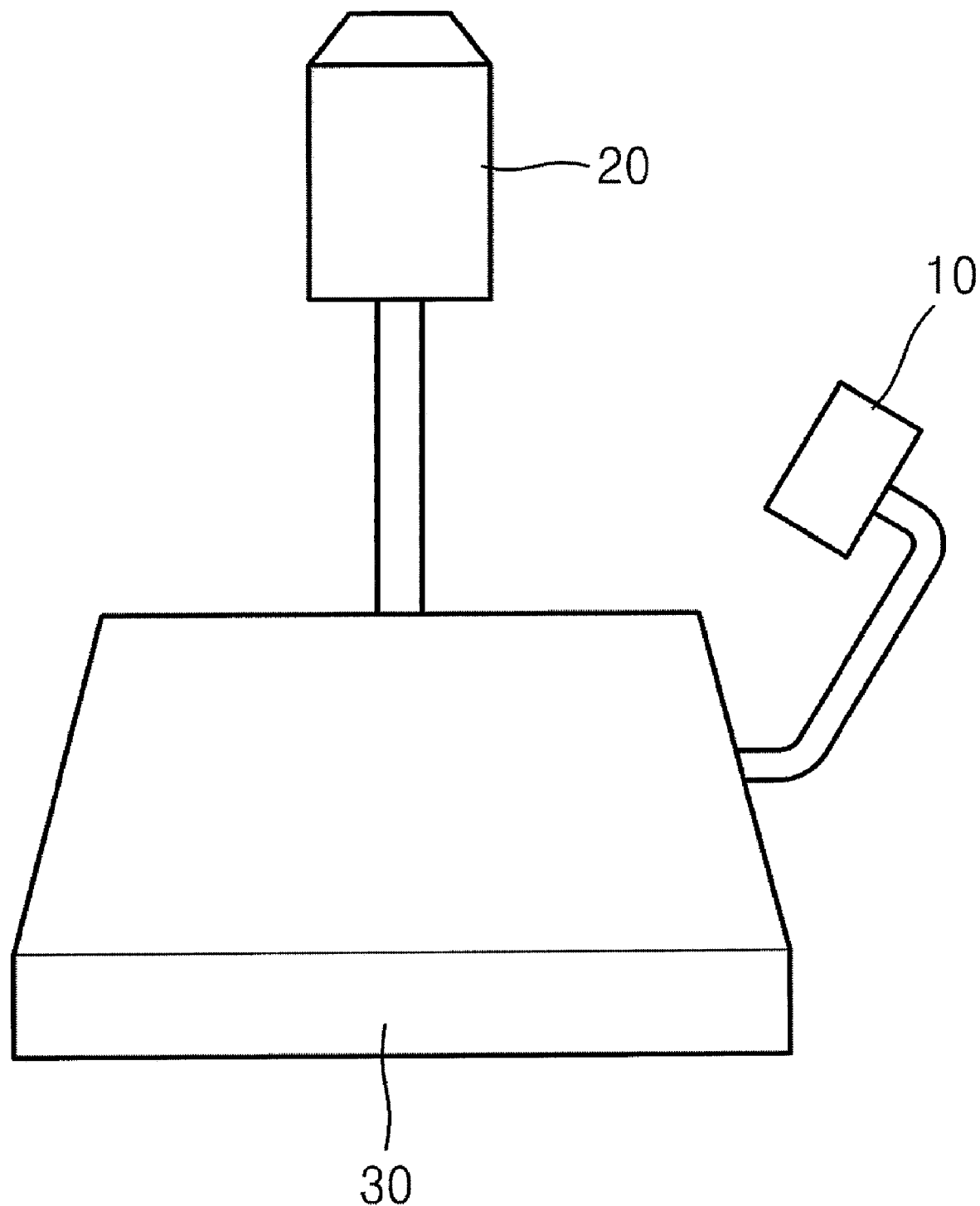
FIG. 7 is a perspective view of an example of a video presenter according to an embodiment of the present invention.
Figure 12:
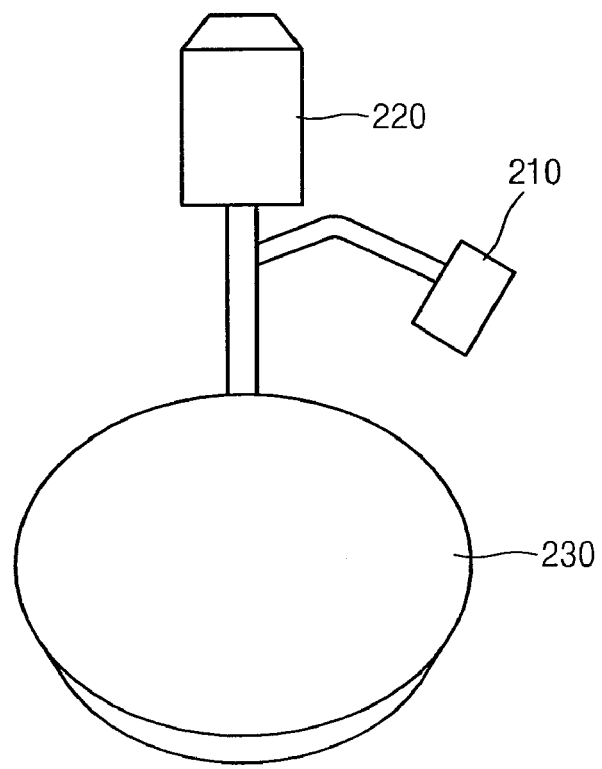
FIG. 12 is a perspective view of an example of a video presenter according to another embodiment of the present invention.

FIG. 7 is a perspective view of an example of a video presenter according to an embodiment of the present invention. Referring to FIG. 7, the video presenter according to the present embodiment includes a stage 30, a photographing unit 20, and an illumination device 10. An object to be displayed, for example, an actual object or a script, is placed on the stage 30. Embodiments of the stage 30 include, but are not limited to, a rectangular shape and a circular shape, as shown in FIG. 12. Many other shapes are possible for the shape of the stage 30.

The photographing unit 20 photographs the object placed on the stage 30 and may be, for example, a digital camera module. The digital camera module may include a charge coupled device (CCD) or a complementary metal oxide semiconductor (CMOS) as a photographing device. The photographing unit 20 is installed above the stage 30 to photograph the object placed on the stage 30.

The illumination device 10 illuminates the object so that the object placed on the stage 30 can be brightly and clearly photographed by the photographing unit 20. To have the original appearance of the object well illustrated by an image of the object, the light provided to the object should be radiated at a uniform luminance throughout the overall surface of the stage 30.

Figure 8:
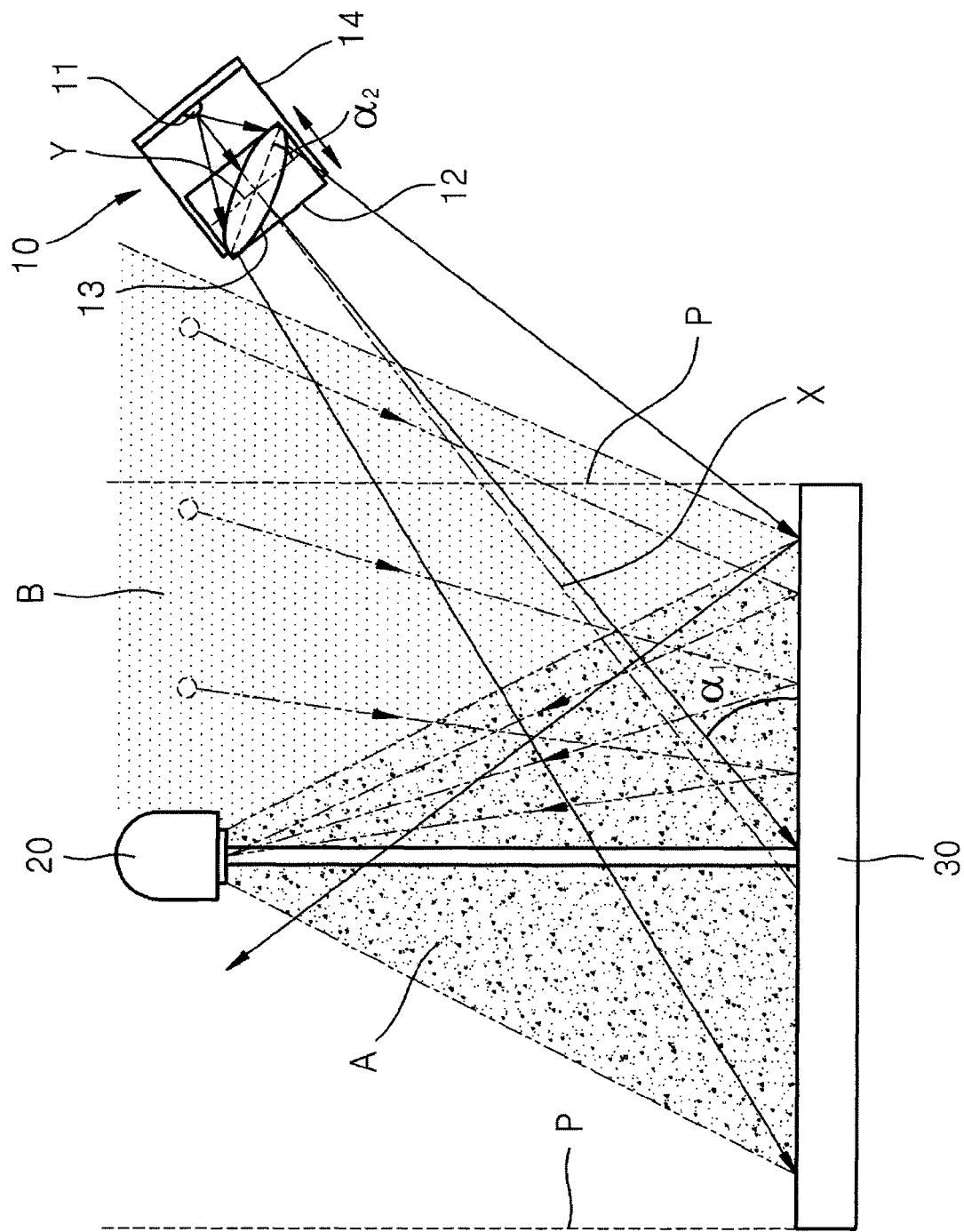
FIG. 8 illustrates an example of the inner structure of the illumination device of the video presenter of FIG. 7.

FIG. 8 illustrates an example of the inner structure of the illumination device 10 of the video presenter of FIG. 7. Referring to FIG. 8, the illumination device 10 includes a light source 11, an optical lens 13, and a barrel 12. The light source 11 radiates light beams that are incident on the stage 30 where an object is placed. A single power light emitting device (LED) may be used as the light source 11. The power LED that is small may operate as a sort of a point light source. Since the power of the power LED has been increased, one power LED can sufficiently work as the light source 11. The power LED is arranged in an inclined direction at a first acute angle $\alpha_1$ with respect to the surface of the stage 30. The first acute angle $\alpha_1$ is made by the surface of the stage 30 and an imaginary line X, that is, a direction that the light source 11 directs, passing the center of the light source 11 and indicating the direction that the illumination device 10 faces.

The illumination device according to the present embodiment may further include a heat radiation unit (not shown) at the rear of a member supporting the power LED. The heat radiation unit is used to externally dissipate heat of the power LED.

Although in the present embodiment a single LED, in particular, a single power LED, is used as the light source 11, the present invention is not limited thereto. For example, two or more power LEDs that can be regarded as a point light source may be provided in the illumination device 10. When a plurality of point light sources are used, an illumination area that is not overlapped may be generated. In such a case, to obtain an overlapping illumination area only, the illumination device 10 may additionally include a mask (not shown) in front thereof, in a direction toward the stage 30. The mask may be arranged between the optical lens 13 and the stage 30. The mask blocks light radiated in the non-overlapped area so that the light beam is incident on the overlapped illumination area.

Also, the light source 11 of the illumination device 10 according to the present embodiment may not be limited to an LED. For example, a compact light source equivalent to a point light source such as an LED can be employed. A compact light source that is not a point light source in the strict sense may be regarded as being a group of a plurality of point light sources. In this case, by using the mask, an illumination area corresponding to an overlapping common area can be obtained.

Figure 9:
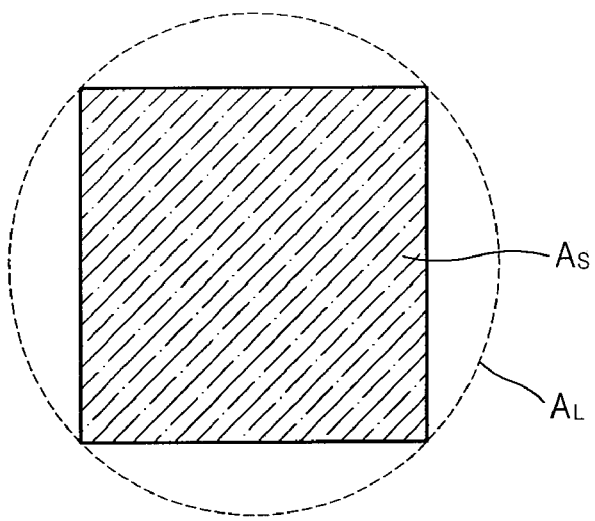
FIG. 9 illustrates the stage area and the illumination area that is illuminated by the light beam radiated by the illumination device of FIG. 8.

The optical lens 13 and the barrel 12 supporting the optical lens 13 are arranged in front of the light source 11. The optical lens 13 make the light beams output from the light source 11 substantially uniformly radiated over the overall surface of the stage 30 without deviating from the surface of the stage 30, as shown in FIG. 9. In the present embodiment, the optical lens 13 may be a convex lens. The optical lens 13 is arranged to be inclined at a second acute angle $\alpha_2$ with respect to an imaginary line Y perpendicular to the imaginary line X, thus making the optical lens 13 pose more parallel to the surface of the stage 30 than if the optical lens 13 were positioned on line Y with its optical axis aligned with line X. More parallel means that the distance between the upper portion of the optical lens 13 and a far side of the stage 30 decreases while the distance between the lower portion of the optical lens 13 and a near side of the stage 30 increases.

The range of the second acute angle $\alpha_2$ may vary according to the spatial position of the illumination device 10. As shown in FIG. 8, the range of the second acute angle $\alpha_2$ may be determined in a manner that the light beam passing through the optical lens 13 can be radiated at a substantially uniform luminance throughout the overall surface of the stage 30.

Referring to FIG. 8, the optical lens 13 is arranged to be inclined at a predetermined acute angle ($\alpha_2$) such that the optical lens 13 becomes more parallel to the surface of the stage 30 from a state of being perpendicular to the direction that the light source 11 directs. Accordingly, the light beam output from the light source 11 and passing through the upper portion of the optical lens 13 is radiated close to the far side of the stage 30 while the light beam output from the light source 11 and passing through the lower portion of the optical lens 13 is radiated close to the near side of the stage 30. As a result, as shown in FIG. 9, the illumination area $A_L$ may cover the overall area of the stage area $A_S$ with the same margins from four sides. By tilting the optical lens 13, the luminous flux that otherwise may have been deviated from the far side of the surface of the stage 30 can be incident on the far side of the surface of the stage 30 so that the amount of the luminous flux increases on the far side of the surface of the stage 30. Thus, the luminance irregularity problem generated in a conventional video presenter may be greatly improved. As a result, the difference in the luminance generated according to the area of the stage 30 can be reduced.

Also since the illumination area $A_L$ covers substantially all the stage area $A_S$, the glitter phenomenon generated as the light is radiated to persons around the video presenter can be reduced or prevented.

An illumination device according to another embodiment of the present invention may further include a distance adjustment unit (not shown). The distance adjustment unit moves the barrel 12 supporting the optical lens 13 forward or backward in a direction along the imaginary line X, that is, toward the stage 30 or far from the stage 30. The distance adjustment unit of the optical lens 13 with respect to the light source 11 may be driven by a variety of drive units, for example, a piezoelectric motor or a step motor, in the direction along the imaginary line X. The distance adjustment unit may be driven manually or automatically by a control unit (not shown). The distance adjustment unit adjusts the distance between the light source 11 and the optical lens 13 along the imaginary line X. By doing so, the area of the illumination area $A_L$ in FIG. 8 can be magnified or reduced. Thus, light efficiency can be increased.

In embodiments, the light source 11 and the optical lens 13 are arranged outside a space defined by at least an edge P of the stage 30. In embodiments, when viewed in a direction perpendicular to the surface of the stage 30, the illumination device having the light source 11 and the optical lens 13 are arranged outside at least the edge P of the stage 30.

At least a part of an illumination device having a light source and an optical lens may be arranged outside an area A and an area B of FIG. 8. The area A indicating an area within a range of a photographing angle of the photographing unit 20 is an area in which the light source 10 is arranged such that the light beam output from the light source 11 and reflected by an object, for example, a glossy film or a glossy paper, that is substantially planar with a high reflectance and placed on the stage 30 is incident on the photographing unit 20.

This is because, when the light source 11 is located in an area B, the light beam output from the light source 11 and reflected from a portion of the object having a high reflectance is photographed by the photographing unit 20 so that a glitter phenomenon may be generated in a photographed image. Referring to FIG. 8, it can be seen that the light beams output from the light source 10 positioned at three different positions in the area B are reflected from an object (not shown) placed on the stage 30 and directly input to the photographing unit 20.

Although in the embodiment illustrated in FIG. 8 all portions of the illumination device are arranged outside the areas A and B, the present invention is not limited thereto. That is, while most portions of the illumination device exist outside the area B, part of the illumination device may be arranged to be included in the area B. Accordingly, a video presenter having a glitter phenomenon that may be accepted by a user can be included in the protection scope of the present invention.

The photographing unit 20 such as a camera is arranged in the space defined by the edge P of the stage 30. The first acute angle $\alpha_1$ formed by the imaginary line X indicating the direction that the light source 11 directs and the surface of the stage 30 can be determined in a manner that the light beam output from the light source 11 and specularly reflected by the object is not directly photographed by the photographing unit 20. For example, the maximum angle within a range in which the illumination device 10 is not arranged in an area B while the size of the first acute angle $\alpha_1$ is increased to have the light beam radiated onto the surface of the stage 30 at a uniform lamination, can be determined as the first acute angle.

The illumination device 10 of the video presenter according to the present embodiment may further include a mask. The mask is arranged between the optical lens 13 and the stage 30 and changes the shape of the illumination area $A_L$ of the light radiated by the light source 11 and passing through the optical lens 13 to be the same as the shape of the stage 30. For example, by changing the shape of the illumination area $A_L$ from a circle to a rectangle, the illumination area $A_L$ may have a shape corresponding to the stage area $A_S$.

Figure 10:
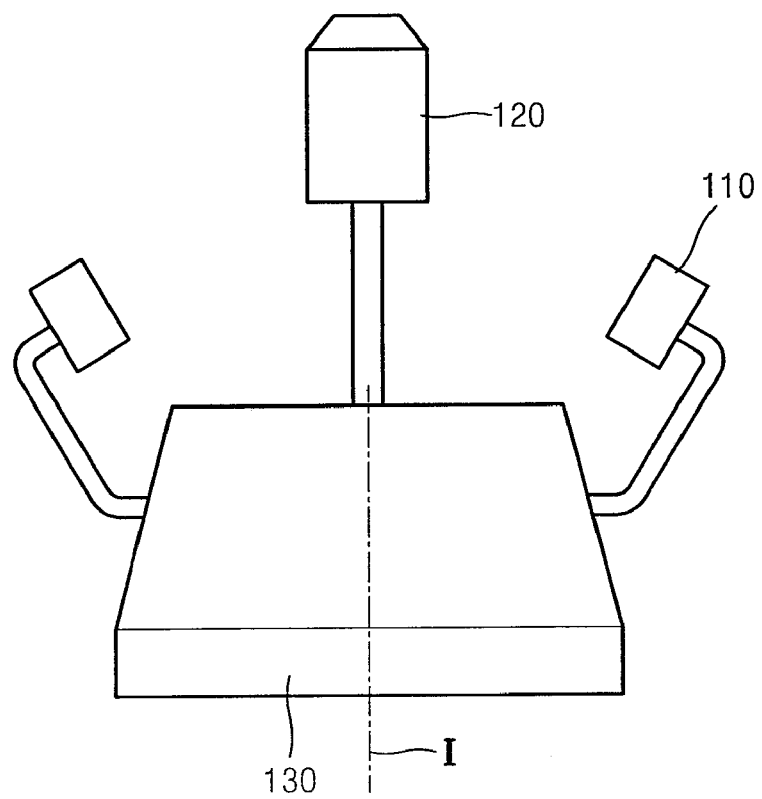
FIG. 10 is a perspective view of an example of a video presenter according to another embodiment of the present invention.

FIG. 10 is a perspective view of an example of a video presenter according to another embodiment of the present invention. Referring to FIG. 10, a pair of illumination devices 110 are provided on a stage 130. The characteristic of each of the illumination devices 110 is the same as that of the illumination device 10 described with reference to FIG. 8. The two illumination devices 110 may be symmetrically arranged to face each other with respect to an imaginary line I passing through a photographing unit 120.

Figure 11:
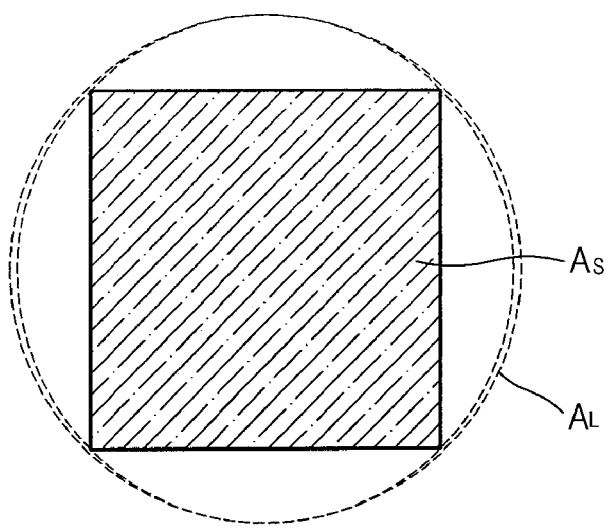
FIG. 11 illustrates the stage area and the illumination area that is illuminated by the light beam radiated by the illumination device of FIG. 10.

In the embodiments of FIGS. 8 and 9, while the luminance irregularity phenomenon is improved, since the illumination device 10 is still located at a side of the stage 30, the luminance irregularity phenomenon generated due to the distance difference between the light beam passing through the upper portion of the optical lens 13 and incident on the far side of the stage 30 and the light beam passing through the lower portion of the optical lens 13 and incident on the near side of the stage 30, still remain. In the embodiment shown in FIG. 10, the illumination irregularity phenomenon can be lessened because the difference in illumination is lessened by the two illumination devices 110 arranged symmetrically. Also, since the illumination areas $A_L$ in FIG. 11 are substantially overlapped, a light amount that is about two times larger than a case in which only one illumination device is provided can be obtained so that a brighter image can be obtained.

Figure 13:
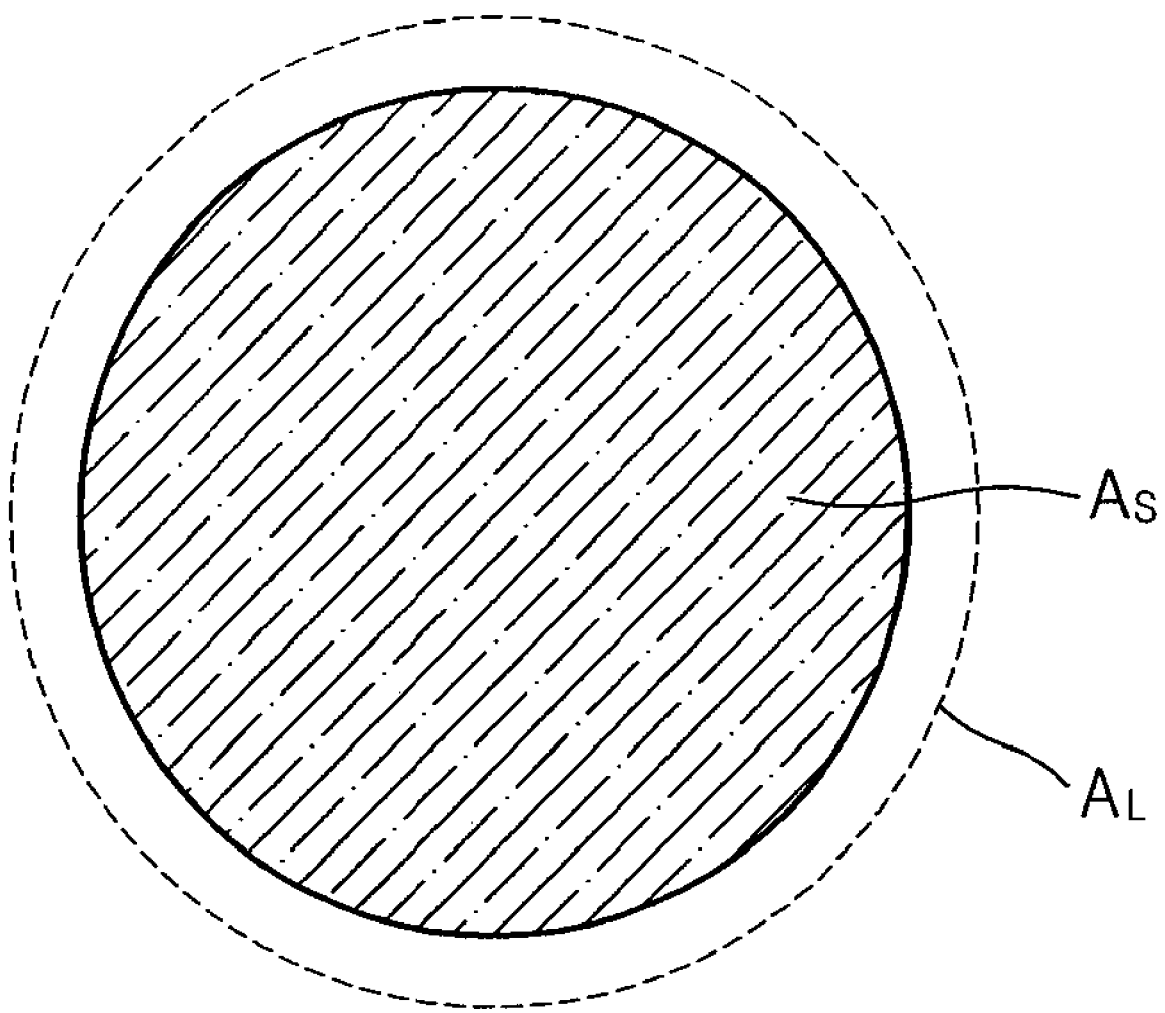
FIG. 13 illustrates the stage area and the illumination area that is illuminated by the light beam radiated by the illumination device of FIG. 12.

FIG. 12 is a perspective view of an example of a video presenter according to an embodiment of the present invention. Referring to FIG. 12, a difference from the embodiment of FIG. 8 is that the shape of a stage 230 is a circle and an illumination device 210 is installed at a photographing device 220. As shown in FIG. 13, since the shape of the stage area $A_S$ corresponds to the shape of the illumination area $A_L$, more efficient illumination is available compared to the previous embodiment in which the shape of the stage 30 or 130 is rectangular.

Although it is not shown in the drawings, a video presenter according to another embodiment may include two illumination devices. In such an embodiment, as in the above-described embodiments of FIGS. 10 and 11, the luminance irregularity phenomenon is lessened by the difference in the distance between the light beams due to the two illumination devices so that luminance uniformity can be improved. Also, a brighter image can be obtained due to the increased light amount.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An illumination device for a video presenter, the illumination device comprising:
   a light source radiating light beams incident on a stage where an object to be photographed is placed and the light source is arranged inclined at an acute angle with respect to a surface of the stage; and
   an optical lens arranged between the light source and the stage and inclined to be more parallel to the surface of the stage than if aligned with the axis of the light source.

2. The illumination device for a video presenter of claim 1, wherein the light source includes a light emitting diode (LED).

3. The illumination device for a video presenter of claim 1, wherein the optical lens is a convex lens.

4. The illumination device for a video presenter of claim 1, wherein the light source and the optical lens are arranged outside a space defined by an edge of the stage.

5. The illumination device for a video presenter of claim 1, wherein the optical lens is arranged in a manner that the light beams passing through the optical lens are radiated throughout an substantially an overall surface of the stage at a substantially uniform density.

6. The illumination device for a video presenter of claim 1, further comprising a distance adjustment unit adjusting a separation distance between the light source and the optical lens in the direction that the light source directs.

7. A video presenter comprising:
   a stage where an object to be photographed is placed;
   a light source radiating light beams incident on the stage and arranged inclined at an acute angle with respect to a surface of the stage;
   an optical lens arranged between the light source and the stage and the optical lens is inclined to be more parallel to the stage than if aligned with the axis of the light source; and
   a photographing unit for photographing the object.

8. The video presenter of claim 7, wherein the light source and the optical lens are arranged outside a space defined by an edge of the stage, and the photographing unit is arranged inside a space defined by the edge of the stage.

9. The video presenter of claim 8, wherein at least a part of an illumination device having the light source and the optical lens are arranged outside an area A and an area B, wherein the area A is an area within a range of a photographing angle of the photographing unit and an area B is an area in which the light source is arranged such that a light beam output from the light source and reflected by an object that is substantially planar with a high reflectance and placed on the stage is incident on the photographing unit.

10. The video presenter of claim 7, wherein the acute angle is determined in a manner such that a light beam of the light source reflected from an object that is substantially planar with a high reflectance and placed on the stage is not directly incident on the photographing unit.

11. The video presenter of claim 7, wherein the optical lens is arranged in a manner that the light beams passing through the optical lens are radiated throughout an overall surface of the stage at a substantially uniform density.

12. The video presenter of claim 7, further comprising a distance adjustment unit adjusting a separation distance between the light source and the optical lens in the direction that the light source directs.

13. The video presenter of claim 7, wherein the light source and the optical lens are symmetrically arranged with respect to the photographing unit.

14. The video presenter of claim 7, wherein a surface of the stage is rectangular or circular.

15. The video presenter of claim 7, further comprising a mask arranged between the optical lens and the stage.

16. An illumination device for a video presenter, the illumination device comprising:
  a light source radiating light beams incident on a stage where an object to be photographed is placed and arranged inclined at an acute angle with respect to a surface of the stage; and
  an optical lens arranged between the light source and the stage and forming a path of the light beam such that an illumination area formed by the light beam output from the light source is not substantially deviated from a surface of the stage and radiated at a substantially uniform density on the surface of the stage.

* * * * *